United States Patent

[11] 3,590,470

| [72] | Inventor | Wallace E. Brainard |
| | | New Berlin, Wis. |
| [21] | Appl. No. | 823,732 |
| [22] | Filed | May 12, 1969 |
| [45] | Patented | July 6, 1971 |
| [73] | Assignee | Kearney & Trecker Corporation |
| | | West Allis, Wis. |

[54] UNITARY TOOL STORAGE AND CHANGING MECHANISM
12 Claims, 12 Drawing Figs.

[52] U.S. Cl. ................................................ 29/568, 29/26
[51] Int. Cl. ........................................... B23q 3/157
[50] Field of Search ........................................ 29/568, 26

[56] References Cited
UNITED STATES PATENTS

| 3,520,050 | 7/1970 | Trebble .................. | 29/568 |
| 3,451,125 | 6/1969 | Lehmkuhl ............... | 29/568 |
| 3,492,717 | 2/1970 | Seidel et al. ............ | 29/568 |

*Primary Examiner*—Andrew R. Juhasz
*Assistant Examiner*—Z. R. Bilinsky
*Attorneys*—Donald E. Porter and William C. Gileisner, Jr.

ABSTRACT: This invention relates to a greatly simplified tool storage and changing mechanism for a machine tool. To accomplish this, a plurality of cutting tools are disposed in a radial array relative to a tool receiving operator. Each tool is carried at the outer end of a single pivotal support with each respective support being individually pivotal to insert a tool carried thereby into the tool operator. After insertion by a single movement of its associated support, securing means are actuated to releasably secure the inserted tool to the operator for performing a desired machining operation. The inserted tool can be returned to a parked or storage position by simply releasing the securing means and pivoting the associated tool support outwardly for returning the tool carried thereby to stored position. In other words, each tool support is pivotal in one direction for inserting a tool into the operator, and is pivotal in open direction for inserting a tool into the operator, and is pivotal in the opposite direction for returning that tool to a radially disposed storage position.

INVENTOR
WALLACE E. BRAINARD
ATTORNEY
William C. Gleisner Jr.

UNITARY TOOL STORAGE AND CHANGING MECHANISM

BACKGROUND OF THE INVENTION

The present invention can be classified generally with a group of prior devices identified as machining centers. In present parlance, a machining center comprises a machine having the capability of bringing a plurality of different metal cutting tools to a workpiece in selected sequence for performing a sequence of different metal cutting operations upon that workpiece. A first group of machines in that category was provided with a plurality of different power driven machine tool spindles or tool operators that were individually operative to perform machining operations in selected sequence. A second group of such machines were each provided with one individual tool operator or spindle positionable with respect to a plurality of different tools releasably stored in an indexable tool storage magazine; and with power driven tool interchange means operatively disposed to interchange a tool carried by the spindle with a preselected tool in the indexable magazine. Although extremely effective, machines in both groups one and two were extremely complex and expensive.

BRIEF SUMMARY OF THE INVENTION

The present invention comprises a tool operator or spindle carried in predetermined fixed relationship to a plurality of radially disposed tools carried at the outer end of individually pivotal tool supports. Thus, during operation, one tool support may be pivoted inwardly to insert a tool carried thereby into the tool operator with the other tool supports being retained in outward stored position. In the event a tool interchange is required, the support carrying the tool in the spindle is simply pivotally returned to parked position thereby returning the tool carried thereby to a storage position. Next, a different support carrying another selected tool is pivoted from storage position to insert that tool into the tool operator for utilization performing the next required machining operation. Prior to removing the first tool from the spindle, tool securing means associated with the tool operator are actuated to released position. Likewise, after insertion of the next selected tool, the tool securing means are again actuated to secure the next selected tool to the tool operator. Aside from actuating the tool securing means associated with the tool operator or spindle, only two extremely simplified movements are required to effect a tool interchange, i.e. pivotal return movement of one tool support to tool storage position and sequential pivotal movement of a different preselected tool support in the opposite direction to insert a tool carried thereby into the tool operator. In addition to greatly simplifying the mechanism for effecting the support mechanism for automatic insertion, withdrawal, or interchange of tools, the present invention likewise obviates the necessity for complex tool coding or identification means.

BRIEF DESCRIPTION OF THE DRAWINGS

The obvious features and advantages of the present invention will become more apparent from the following detailed description of the preferred embodiment shown in the accompanying drawings, in which:

FIG. 3B is a fragmentary view in side elevation of the toolholder shown in FIG. 3 in engaged position;

FIG. 6A is an enlarged fragmentary view in perspective of the modified tool support illustrated in FIG. 6;

DESCRIPTION OF THE PREFERRED EMBODIMENTS

Figure 1:
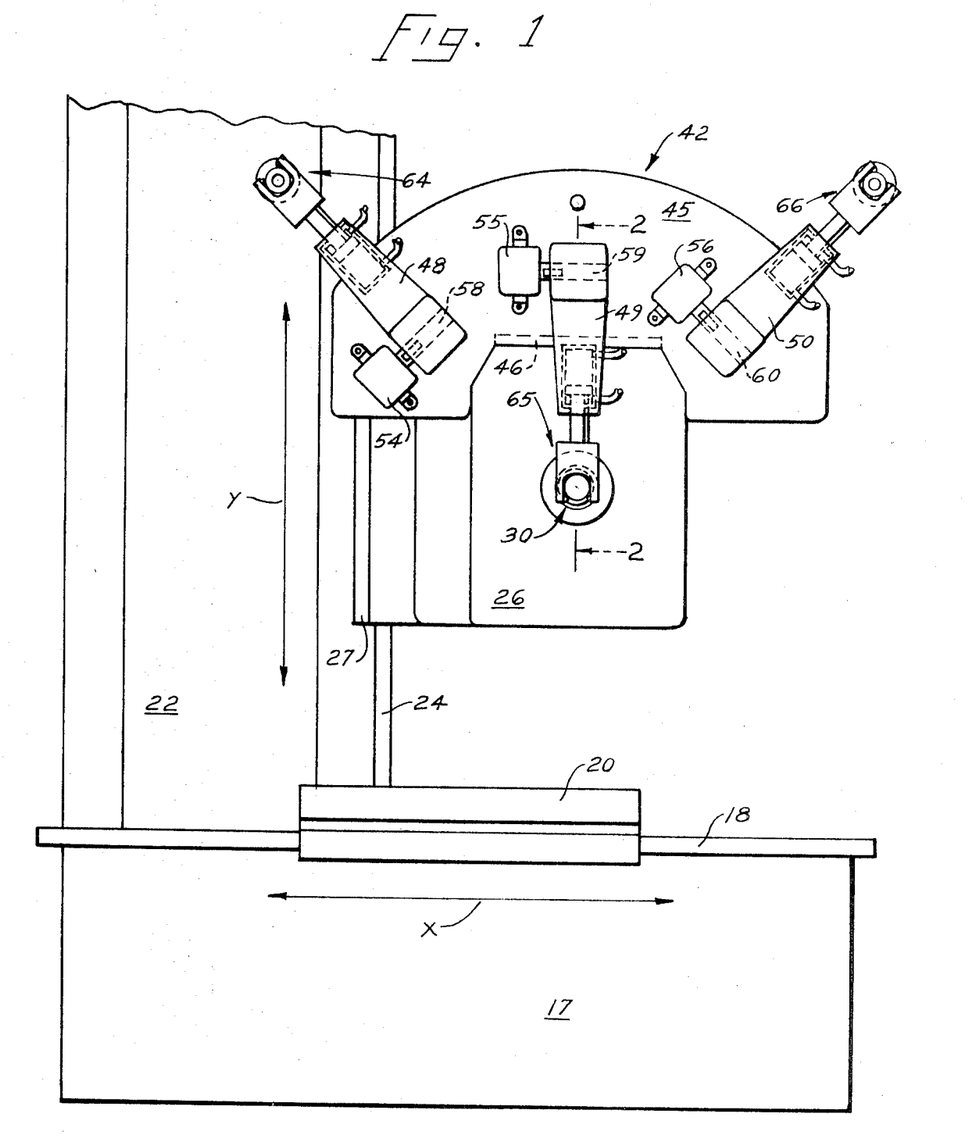
FIG. 1 is a view in front elevation of a machine tool incorporating the improved tool storage and tool changing mechanism.

Referring now to the drawings and specifically to FIG. 1 thereof, a machine tool incorporating the features of the present invention is illustrated in front elevation. As there shown, a supporting machine base 17 is provided on its upper face with the usual spaced apart horizontal guideways, only one guideway 18 being shown in FIG. 1. Complementary guideways (not shown) presented by the underside of a work supporting table 20 are disposed to slidably engage the horizontal guideways 18 presented by the machine base or bed 17. Power driven translating means (not shown) carried within the base 17 are connected in known manner to effect selective movement of the work table 20 in either horizontal direction along an X axis in well-known manner.

An upstanding vertical column 22 is fixedly secured to the upper face of the base 17 and cooperates therewith to constitute a unitary machine frame for supporting a cutting tool in operative relationship to a work support. The front face of the vertical column 22 is provided with a pair of spaced apart vertically extending guideways, only one vertical guideway 24 being shown in FIG. 1. To support a cutting tool relative to a workpiece carried by the table 20, a spindle head 26 is mounted for vertical movement along a Y axis in response to power driven translating means (not shown). The spindle head 26 is provided on its rearward face with spaced apart guideways (not shown) retained in slidable engagement with the vertical column guideways 24 by securing means such as vertical gibs 27.

Figures 2, 6:
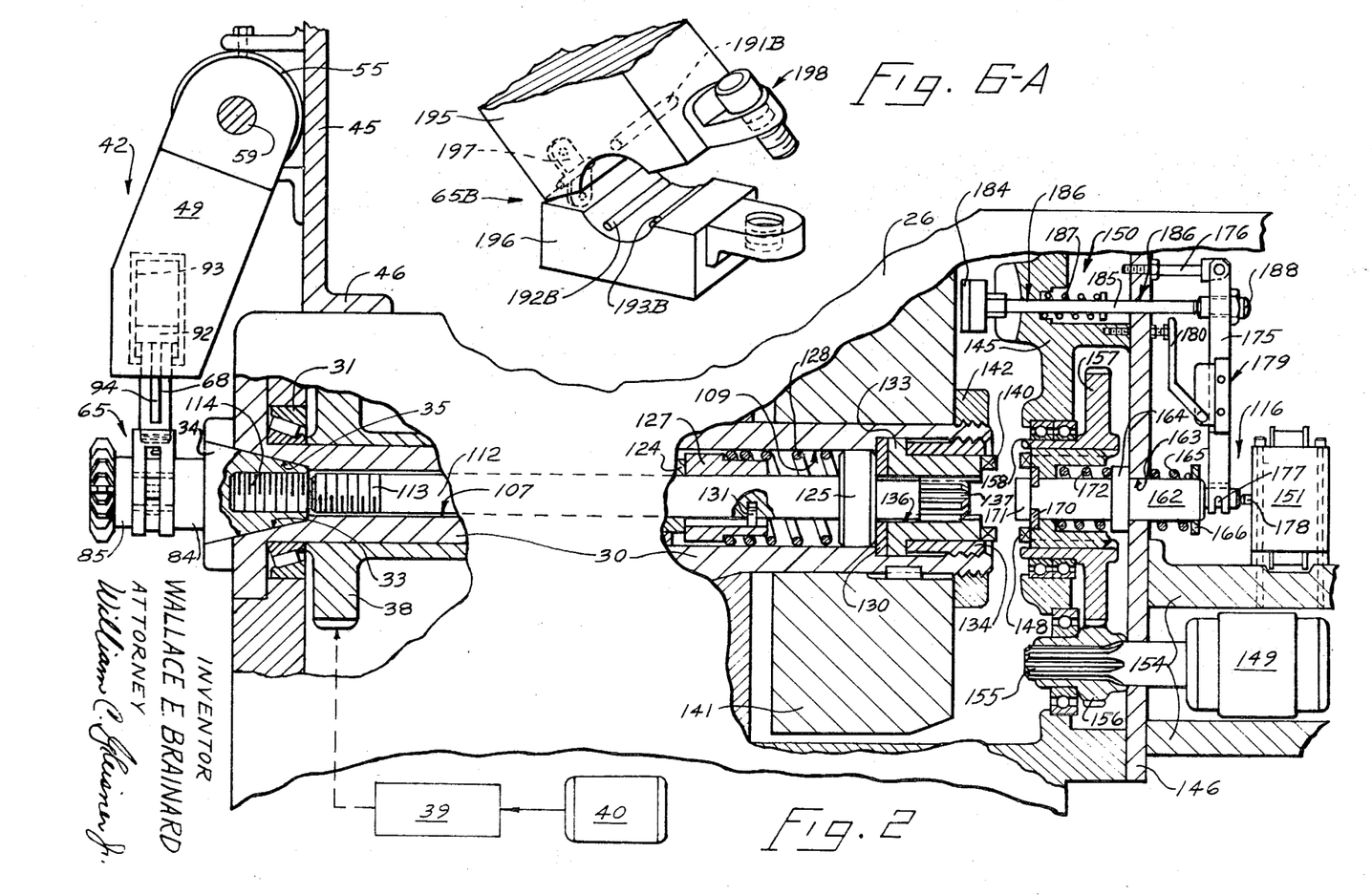
FIG. 2 is a fragmentary enlarged view, partly in vertical section and partly in elevation, through the spindle head and a pivotal tool support and being taken along the plane represented by the line 2-2 in FIG. 1.
FIG. 6 is an enlarged fragmentary view partly in front elevation and partly in transverse section through a tool support illustrating a releasable, modified form of tool support.

For releasably supporting a tool, a horizontal tool spindle 30 is rotatably journaled in the spindle head 26 as illustrated in FIGS. 1 and 2. The spindle 30 is rotatably journaled within the spindle head 26 by means of horizontally spaced front and rear bearings, only the front bearing 31 being shown in FIG. 2. At its forward end, the tool spindle 30 is provided with an internal taper 33 adapted to releasably receive a complementary conical toolholder 34 adapted to receive a selected one of a plurality of different tools.

A drive gear 38 keyed to the spindle 30 by means of a key (not shown) is connected in well-known manner to be driven by a variable speed mechanism 39 that is driven by a selectively energizeable motor 40.

For selectively inserting a tool into the conical spindle 30 or for withdrawing a tool therefrom, improved coordinately operable tool storage and tool change means 42 are carried in fixedly spaced relationship to the tool spindle. As shown in FIGS. 1 and 2, a vertically upstanding tool change support plate 45 is provided at its lower forward edge with a rearwardly extending flange 46 that is directly and fixedly secured to the upper face of the outer housing for the spindle head 26. Irrespective of bodily movement of the spindle head 26 relative to the work table 20, the vertical tool support plate 45 is movable with the spindle head 26 to facilitate return movement of a tool from the spindle 30 to storage, as well as facilitate movement of the next selected stored tool into operative engagement with the tool spindle 30. Although only X and Y axes of movements are shown and described in the present invention, it will be understood that the spindle head 26 can be mounted for selective power driven movements are shown and described in the present invention movement along a horizontal Z axis relative to the supporting saddle gib 27 and work table 20 in well-known manner. In such a case, it will likewise be understood that the vertical tool storage plate 45 will be secured by means of its adjacent flange 46 for unitary movement with the spindle head 26 along the Y axis and the Z axis (not shown).

To support tools for selective interchange with the tool spindle 30, a plurality of tool support arms such as the arms 48, 49 and 50 are pivotally carried by the vertical storage plate 45. Each of the tool support arms 48, 49 and 50 is mounted for pivotal movement along a plane extending in a direction radial to the axis of the tool receiving spindle 30. A corresponding plurality of hydraulically actuatable torque motors 54, 55 and 56 have bases fixedly bolted and secured directly to the support plate 45. The motors 54, 55 and 56, in turn, are provided with axially extending reversible drive shafts 58, 59 and 70 which directly and respectively support the inner ends of the tool support arms 48, 49 and 50. As indicated in FIG. 1, the respective tool support arms 48, 49 and 50 are keyed directly to the motor support drive shafts 58, 59 and 60 respectively. As shown in FIG. 1, the motors 54 and 56 are actuated to pivot the respective tool support arms 48 and 50 in an upward direction to retain the tools carried thereby in an upper, stored position relative to the support plate 45 and tool spindle 30. As shown in FIGS. 1 and 2, the center torque motor 55 is illustrated as having rotated the center tool support arm 49 from upper stored position in a downward direction to directly insert the conical toolholder 34 carried thereby directly into the tapered tool receiving end of the tool spindle 30. After the toolholder 34 has been inserted into the spindle 30 and secured thereto by means of associated toolholder securing means, tool latching means 65 associated with the center pivotal support arm 49 are moved to disengaged position in a manner that the tool spindle 30 can be rotated under power for performing machining operations.

Figure 3:
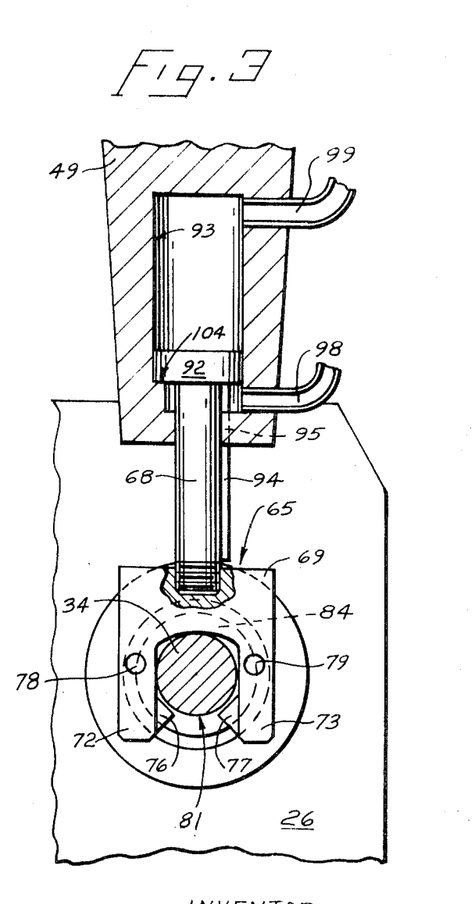
FIG. 3 is a fragmentary enlarged view, partly in elevation and partly in transverse vertical section showing the tool support of FIG. 2 in tool engaging latched position.
Figure 3A:
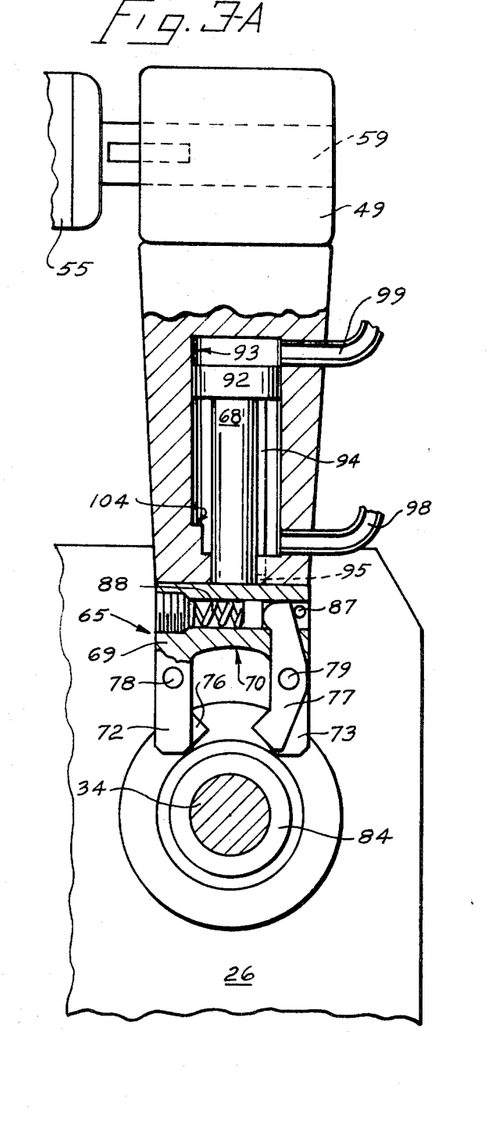
FIG. 3A is a similar view to FIG. 3 and showing a tool support in disengaged position.

In order that an inserted toolholder can be disengaged from its associated pivotal support arm, selectively disengageable tool latching means 64, 65 and 66 are respectively associated with the individually pivotal tool support arms 48, 49 and 50. As shown in FIGS. 3, 3A and 3B, the tool latching or clamp means 65 comprises essentially a support rod 68 extending outwardly from the pivotal clamp member 49 and having fixedly secured to its outer end a U-shaped clamp member 69. The clamp member 69 is provided with a U-shaped central opening 70 formed between a pair of downwardly depending spaced apart arm members 72 and 73. A pair of resiliently biased latches 76 and 77 are respectively secured by pivot pins 78 and 79 to the spaced apart arm members 72 and 73 presented by the arm member 69. The lower ends of both pivot arms 76 and 77 are resiliently biased inward into snug clamping engagement with a central portion 81 of reduced diameter presented by the toolholder 34. As indicated in these figures, the reduced diameter portion 81 of the toolholder 34 is positioned between outwardly extending spaced apart clamp flanges 84 and 85 integrally formed with the toolholder. As shown in FIG. 3A, the upper end of the pivot arm 77 is normally urged into engagement with a stop pin 87 by means of a compression spring 88 carried within a transversely bored opening in the clamp member 69. Both the stop pin 87 and a threaded stop member are carried within the transverse bored opening of the clamp member 69. As viewed in FIG. 3A, a resilient biasing spring to pivot the lower end of the stop member 76 inwardly is contained in a transverse bored opening in the stop member 69 and in rearwardly spaced relationship to the biasing spring 88. Inasmuch as this general arrangement is known, it is not deemed necessary to show in detail the resilient biasing mechanism for the pivot member 76. It is deemed sufficient to state that the compression spring for the pivot member 76 is spaced rearwardly from the spring 88 in a parallel transverse bored opening formed in the pivot member 69. It should be noted, however, that the rearwardly spaced compression spring (not shown) does function to pivot the lower end of the pivotal clamp member 76 inwardly, or in an opposite direction to the pivotal member 77. Thus, both of the pivotal clamp arms 76 and 77 are retained in resiliently urged clamping engagement with the reduced central diameter 81 of the toolholder 34 during clamped condition, as shown in FIG. 3.

As further indicated in FIGS. 3 and 3A, the support rod 68 is fixedly secured to a piston 92 slidably carried within an actuating cylinder 93 formed within the lower end of the tool support arm 49. To maintain the tool clamp member 69 in proper alignment with the pivotal tool support arm 49, a key 94 secured to the piston rod 68 slidably engages a complementary keyway 95 formed in the lower end of the member 49. In order to actuate the clamp mechanism 65, a pair of hydraulic conduits 98 and 99 are respectively connected to supply hydraulic fluid under pressure to the cylinder 93 contained within the pivotal tool support arm 49.

Whenever line 98 is connected to exhaust and pressure fluid is supplied to hydraulic line 99, the piston 92 is urged outwardly with its movement being limited by a stop 104 formed within the cylinder 93 to position the tool clamp member 69 for properly inserting a toolholder carried thereby into the cooperating tool spindle. After a toolholder has been thus inserted into the spindle, line 99 is connected to exhaust and hydraulic line 98 connected to receive pressure fluid for urging the piston 92 upwardly within the cylinder 93. With the toolholder 34 having been secured within the spindle, upward movement of the piston 92 urges the support rod 68 and clamp member 69 upwardly to resiliently disengage the tool clamp means 65 from the toolholder 34. As this occurs, the upper face of the clamp member 69 is moved upwardly into abutting engagement with the lower end of the pivotal tool support arm 49 as shown in FIG. 3A. Conversely, at the completion of a metal cutting operation utilizing a tool carried by the toolholder 34, the clamp member 69 can be hydraulically reactuated into clamping engagement with the toolholder. To accomplish this, the control system is actuated to reconnect the hydraulic line 98 to exhaust and the hydraulic line 99 to receive hydraulic control fluid under pressure. Thereupon, pressure fluid admitted to the line 99 actuates the piston 92 downwardly within the cylinder 93 to effect corresponding downward movement of the clamp member 69. As this occurs, the resiliently biased clamp members 76 and 77 are reactuated into clamping engagement with the reduced diameter portion 81 of the toolholder 34 between the clamp flanges 84 and 85 respectively presented thereby. In other words, the clamp member 69 and pivotal clamp arm 76, 77 are simply returned into the clamped position illustrated in FIG. 3. Referring now to FIG. 1, it will be apparent that a tool interchange can be effected by so operating the control mechanism as to effect a pivotal return movement of the center support arm 49 thereshown to stored position and, sequentially thereafter, effecting a pivotal movement of the storage arm 48 from its presently viewed storage position to insert a tool carried thereby bodily into the tool spindle 30.

Figure 4:
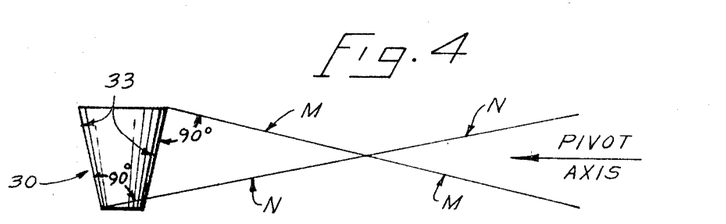
FIG. 4 is an enlarged schematic view of a tapered toolholder shank and illustrating the positioning of the axis for each pivotal tool support.

In order that the spindle support arm 49 is radially pivotal in one movement to bodily insert the toolholder 34 carried thereby into the conical tapered opening 33 of the spindle 30, it is necessary that the pivot axis of the shaft 59 be a predetermined distance from the axis of the spindle 30 according to the relationship of the internal taper 33 presented thereby. This relationship is schematically illustrated in FIG. 4 in which the internal taper 33 of the spindle 30 represents an axial sectional view of the spindle 30 as illustrated in FIG. 2. As likewise schematically shown in FIG. 4, the diagonally intersecting lines M and N are normal to the sides of the spindle taper 33, and intersect the corners thereof as shown. In order to avoid interference during insertion or withdrawal of the tool from the spindle, the arm pivot center for that particular tool must lie on or above the extending line M and on or below the extending line N. The area identified as the support arm pivot axis satisfies both requirements. For a machine tool utilizing a standard No. 50 milling spindle taper, the minimum distance between the tool spindle and the support arm pivot centerlines would be approximately 14 inches. In other words, as shown in FIG. 1, the minimum distance between the axis of the spindle 30 and the respective axes of the support arm pivot shafts 58, 59 and 60 would be 14 inches. With this distance existing, and with the spindle 30 released from the toolholder 34 as well as the clamp mechanism 65 actuated to secure the toolholder 34 to the support arm 49, it will be apparent that the support arm 49 can be pivoted in one single movement in a counterclockwise direction for returning the toolholder to a storage position relative to the support plate 45. Likewise, with the support arm 49 in operate pivoted position relative to the plate 45, a single pivotal movement thereof in a clockwise direction operates without interference to directly insert the tapered rearward shank of the toolholder 34 directly into the conical socket 33 presented by the tool spindle 30.

The tool spindle 30 is provided with an axial circular bore 107 that opens into an enlarged circular opening 109 and is adapted to receive an axially movable draw-in bar 112 for selectively and releasably securing a toolholder within the conical socket presented by the spindle 30. The power operated tool draw-in bar 112 shown in FIG. 2 is generally similar in both structure and mode of operation to the draw-in bar shown and described in U.S. Pat. 3,038,386 which issued to C. A. Parske et al. on June 12, 1962. As shown in FIG. 2, the draw-in bar 112 is provided with a leftward threaded end portion 113 that is selectively rotatable into threaded engagement with a complementary threaded opening 114 formed in the shank of a toolholder 34. Upon pivotal insertion of the toolholder 34 into the conical socket of the spindle 30, the threaded opening 114 is moved into a position to be resiliently engaged by the threaded end 113 of the draw-in bar 112. After insertion of the toolholder into the spindle socket, a power actuator 116 is operated to effect rotation of the draw-in bar 112 in a manner that the threaded end 113 thereof is threaded directly into the complementary threaded opening 114, thereby urging the toolholder 34 into engagement with the tapered socket. During rotational engagement or disengagement of the draw-in bar 112 with the opening in the toolholder 34, the engagement between the clamp mechanism 65 presented by the pivotal support arm 49 with the toolholder 34 is usually sufficient to preclude relative rotational movement of the latter. In addition, however, axially extending keys or lugs (not shown) may be concentrically arranged with the socket 33 to fit into slots (not shown) that may likewise be formed on a collar which may be integrally formed with the toolholder in known manner. Preferably, automatic positioning means (not shown) would then be provided to insure rotational stopping of the tool spindle 30 at the same angular position each time a tool change is to be automatically effected. This will insure corresponding proper angular positioning of a toolholder prior to its being pivotally returned to storage. With such an arrangement, the toolholders in storage would then be properly angularly oriented for reinsertion into the tapered socket presented by the spindle 30.

The draw-in bar 112 is an elongated shaft extending lengthwise in the spindle bore 107. The draw-in bar is rotatably supported within the bore 107 of the spindle 30, with its axis coinciding with the axis of the bore, and forwardly and rearwardly located bushings, the rearward bushing 124 being shown in FIG. 2. Towards its rearward end, the draw-in bar 112 is formed with a thrust collar 125 that is disposed within the enlarged circular portion 109 of the bore. A suitable sleeve 127 is disposed between the thrust collar 125 and the draw-in rod bushing 124. As shown in FIG. 2, a spring 128 acting between the collar 125 and a flanged shoulder integrally formed with the sleeve 127 normally urges the draw-in bar 112 rearwardly in a manner that the thrust collar 125 abuts a thrust bearing 130. The spring 128 is of sufficient length so that when the draw-in bar 112 is in its normal rearward position, the spring will continue to exert a resilient force to insure it being positively maintained in normally retracted position.

To prevent the spring 128 from coiling when the draw-in bar 112 is rotated in either direction, a pin 131 is provided in the draw-in bar 112 and projects radially outward thereof into a longitudinal keyway provided in the sleeve 127. The sleeve 127 will therefore be rotated with the draw-in bar 112, and since the spring 128 is maintained between the collar 125 and the shoulder of the sleeve 127 under a slight compression, the spring will also rotate with the draw-in bar. Thus, the draw-in bar is normally maintained in the retracted position.

The circular thrust bearing 130 is disposed within another concentrically enlarged portion of the enlarged bore 109 and is seated against a flanged shoulder adjacent the bore 109. A tubular driving clutch element 133 of smaller diameter than the enlarged bored opening is provided with an enlarged, flanged lower end seated directly within the enlarged opening in concentric relationship above the thrust bearing 130. The underside of the flanged angular bearing presented by the clutch element 133 retains the thrust bearing 130 in a position to guidably constrain the thrust collar 125 and draw-in rod 112 against further axial, rightward movement. To accomplish this, a tubular locking sleeve 134 is threadedly secured within a complementary threaded opening formed in the extreme outer end of the tool spindle 30. In this manner, the locking sleeve 134 is secured to the spindle 130 to constitute a bearing that rotatably supports the tubular, flanged clutch element 133 for relative rotational movement. Axially extending drive splines 136 formed within the bored opening of the clutch element 133 are maintained in slidable splined engagement with complementary splines 137 formed on the extreme outer end of the rotatable draw-in bar 112.

The clutch element 133 is provided with a plurality of axially extending teeth 140, which may be two in number, spaced diametrically opposite to each other. The rearwardly extending driven clutch teeth 140 on the tubular clutch element 133 provide the means by which the driven element may be rotated in either direction to effect corresponding rotational movement of the draw-in bar 112 in either direction. A flywheel 141 is fixedly keyed to the rearward end of the spindle 30 and is secured thereto by means of a lock nut 142 threadedly secured to the rearward end of the spindle. A transverse support plate 145 integrally formed within the spindle head 26 is positioned in spaced parallelism to a transverse support plate 146 secured therein and cooperating therewith to support the power actuator 116 for effecting selective rotational movement of the tubular clutch element 133.

The power draw-in bar arrangement of this invention comprises a driving clutch member generally identified by the reference numeral 148, a reversible electric drive motor 149 and a cooperating spindle locking mechanism or brake for preventing rotation of the spindle 30 during tool engagement or disengagement and generally identified by the reference numeral 150. In addition, a solenoid 151 is selectively energizeable to effect a coordinate axial engagement of driving clutch element 148 with driven clutch element 140 along with frictional engagement of the spindle brake mechanism 150. As will hereinafter be more fully explained, the solenoid 151 is energized coordinately with selective energization of the drive motor 149 to locate the power draw-in rod 112 into threaded engagement or disengagement with a tool inserted into the conical spindle socket as may be required.

Power for rotating the draw-in bar 112 in a selected direction is derived from the motor 149 which is supported within the walls of a housing 154 bolted to the transverse support plate 146 by means of bolts (not shown). As shown in FIG. 2, the solenoid 151 is bolted to the center housing wall 154 in a manner that both the solenoid and the motor 149 are retained in fixedly spaced relationship to the power actuator 116 for driving the draw-in bar 112. From the motor 149, power is transmitted via a splined output shaft 155 to rotate a gear 156 having driving engagement with a gear 157, both gears being rotatably journaled in the transverse support plate 145 and constrained thereby against axial movement in either direction.

The inner elongated hub 158 of the gear 157 is provided with axial splines having slidable engagement with the complementary, axial splines presented by the clutch element 148. The axial splined connection between the hub 158 of gear 157 and the sleeve 159 carrying the clutch 148 permits axial movement of the clutch 148 into engagement with the driven clutch 140, and prevents relative rotation between this sleeve and the gear 157. The internally splined driving clutch 148 is provided with a central bored opening encircling the lower end of an axially movable support shaft 162 that in turn is carried for selective axial movement within a circular bored opening 163 formed in the central support plate 146. The support shaft 162 is integrally formed with an enlarged circular portion 164 that is normally retained in abutting engagement with the underside of the support plate 146 and functions as a positive stop for the axially movable support shaft 162. To accomplish this, a compression spring 165 encircling the upper end of the shaft 162 is interposed between the upper face of the transverse plate 146 and a circular retainer 166 secured to the rightward end of the shaft. The leftward end of the axially movable shaft 162 is coupled to the central portion of the clutch element 148 by means of a retainer 170 secured in position by means of a cap screw 171 threaded in the end of the shaft 162. Another compression spring 172 is interposed between the enlarged circular portion 164 of the shaft 162 and inwardly extending shoulder integrally formed with the clutch element 148.

Upon energization of the solenoid 151, it will be apparent that the shaft 162 is urged in an axially leftward direction compressing the upper spring 165 and urging clutch 148 into engagement with clutch 140.

For effecting coordinate control of the several parts comprising the power actuator 116, a lever arm 175 is pivotably secured at one end to a bolt 176 secured to the transverse support plate 146. The opposite or outer end of the lever arm 175 is pivotally connected by a pin 177 to a reduced diameter portion of the axially movable shaft 162. The solenoid 151 is bolted to the center wall of the housing 154 in a manner that the actuating solenoid plunger 178 engages the outer end of the axially movable shaft 172. A control switch 179 carried by the central portion of the lever arm 175 is provided with an actuating plunger 180 positioned to energize the motor 149 in a selected direction upon downward pivotal movement of the lever arm 175.

The spindle brake 150 comprises a friction pad 184 secured to the lower end of a rod 185 that extends through spaced apart bored openings 186 respectively formed in the support plates 145 and 146. A spring 187 interposed between the stationary plate 145 and a thrust washer on the rod 186 urges the latter upwardly into engagement with an adjusting pin 188 threadedly engaged in the lever arm 175. Thus, upon energization of the solenoid 151 the actuating plunger 178 thereof is urged axially outward to move the lever arm 175 downwardly. Outward pivotal movement of the lever arm 175 effects simultaneous engagement of the friction pad 184 with the upper face of the spindle flywheel 141; outward movement of the switch 179 to move the actuating arm 180 for energizing the motor 149 in selected directions; and, outward movement of the driving clutch 148 into driving engagement with the clutch 140 for effecting rotational movement of the draw-in rod 112 in selected direction. It will be apparent that rotation of the rod 112 in one direction effects threaded engagement of the lower end 113 thereof into threaded engagement with the toolholder in the spindle; and, conversely rotational movement of the draw-in bar 112 in the opposite direction effects threaded disengagement of the lower end thereof to release its engagement with a toolholder in the conical spindle socket.

After the draw-in bar has been rotated in a direction for threading it into the toolholder, the spring 128 is completely compressed and the spindle bushing is moved into position for fixedly retaining the toolholder in the spindle. After this occurs, the solenoid 151 is deenergized permitting resiliently biased outward pivotal movement of the lever arm 175 to effect simultaneous disengagement of the friction pad 184, disengagement of the driving clutch 148, and deactuation of the switch 179 for deenergizing motor 149. With this condition established, the draw-in bar 112 threadedly engages the toolholder and the tool spindle 30 is operable in the usual manner to perform a machining operation.

For automatically removing a tool from the spindle 30, the solenoid 151 can be reenergized to effect coordinate engagement of the friction brake 184, and the driving clutch 148 with driven clutch 140 in coordinated relationship with actuation of the switch 179 to energize the motor 149 for rotating the draw-in bar 112 in a reverse direction and out of threaded engagement with the toolholder in the spindle. Reverse rotation of the draw-in bar 112 continues until the threaded portion thereof is completely disengaged from the toolholder and a thrust bushing 125 is returned to the position illustrated in FIG. 2. With this condition reestablished, and assuming the tool clamp means 65 are actuated into clamped engagement with the toolholder in the spindle, the tool support arm 49 is pivotal in reverse direction to remove one toolholder from the spindle. Thereupon, a different one of the toolholders can be pivoted downwardly to bodily insert a different toolholder into the spindle for selective engagement with the threaded draw-in bar 112.

Figure 5:
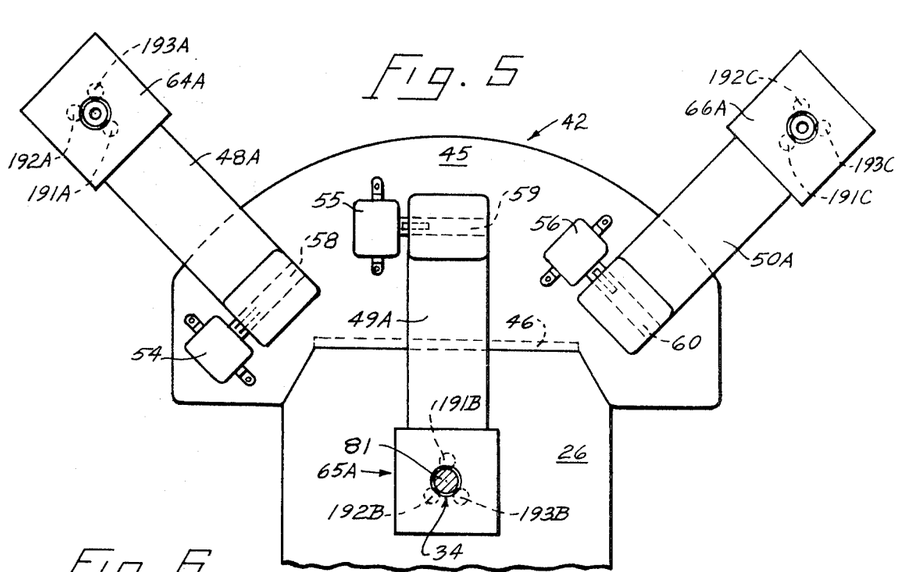
FIG. 5 is an enlarged fragmentary view in front elevation of a spindle head provided with a modified form of pivotal tool storage support arm.
Figure 6:
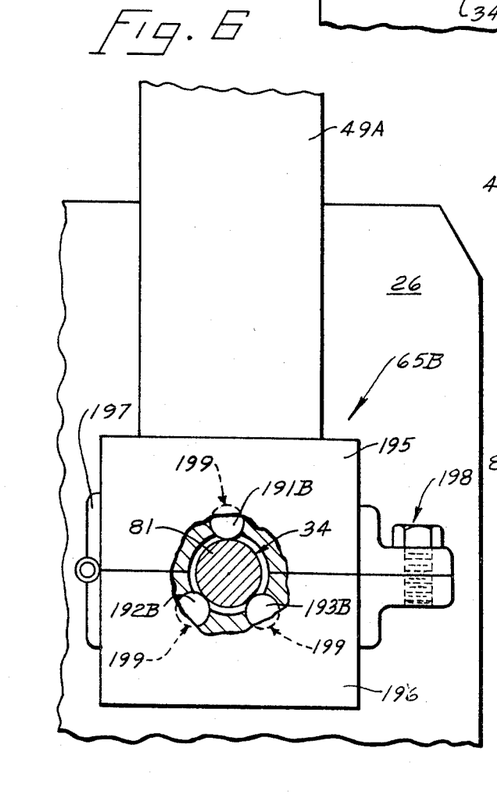
Figure 7:
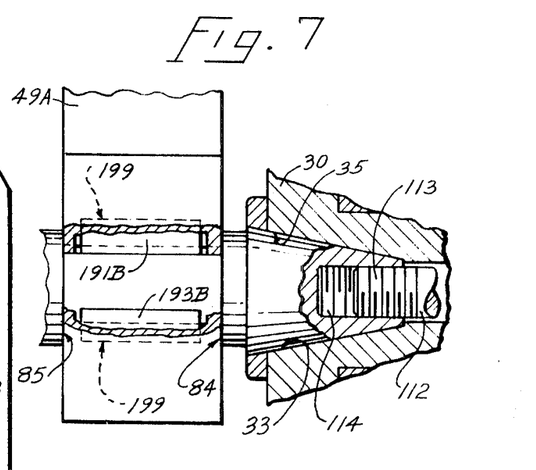
FIG. 7 is an enlarged fragmentary view partly in side elevation and partly in section through a modified tool support and associated tool operator.

A modified form of the invention is illustrated in FIGS. 5, 6 and 7 which does not require the disengageable tool clamp means 64, 65 and 66 described and shown in connection with FIG. 1. Instead of the selectively disengageable tool clamp means 64, 65 and 66 illustrated in FIGS. 1 and 2, the pivotal tool support arm shown in FIG. 5 are provided with antifriction bearings disposed to be maintained in continuous engagement with the toolholder irrespective of whether they are in stored position or in operating position in the tool spindle. As shown in FIG. 5, a spindle head 26 is represented in fragmentary form with a vertically upstanding tool storage support plate 45 secured thereto. Likewise, as previously described in connection with FIG. 1, tool support arm drive motors 54, 55 and 56 are secured in similar manner to the support plate 45 shown in FIG. 5. The drive motors 54, 55 and 56 in FIG. 5 are provided with rotatable drive shafts 58, 59 and 60 to which are respectively keyed modified tool support arms 48A, 49A and 50A. To support tools for pivotal movement from stored position to the tool spindle 30 and return, tool support means 64A, 65A and 66A are respectively and fixedly secured to the outer ends of the corresponding pivotal tool support arms. The general arrangement and mode of operation of each of the tool support means is identical. Each of them is provided with three triangularly spaced roller bearings to rotatably support a toolholder support. As shown in FIG. 5, tool support means 64A secured to the pivotal support arm 48A is provided with the triangularly spaced toolholder roller bearings 191A, 192A and 193A In similar manner, tool support means 65A is provided with triangularly spaced roller bearings 191B, 192B and 193B shown in position to rotatably support the reduced diameter circular portion 81 of the toolholder 34. The tool support means 66A associated with the pivotal tool support arm 50A is likewise provided with triangularly spaced roller bearings 191C, 192C and 193C. Although not shown in FIG. 5, it will be apparent that each of the pivotal tool support means 64A, 65A and 66A may be constructed with a transverse slot to facilitate loading and unloading of tools, whenever the support arms 193A. therewith are in upward storage position. It will likewise be apparent that the toolholders can be disassembled for removal from any of the tool support means that are in storage positions.

A modified form of tool support means 65B is illustrated in FIGS. 6, 6A and 7. As there shown, the support means 65B comprises an upper portion 195 directly secured to the end of the pivotal support arm 49A and the lower portion 196 pivotally secured thereto by means of a pivot hinge 197. During operation, a latch mechanism 198 including a releasable screw is operative to maintain the lower portion 196 fixedly secured to the upper portion 195 in a manner that the tubular roller bearings 191B, 192B and 193B engage the reduced diameter portion 81 of the toolholder 34. Each of the roller bearings is rotatably supported in complementary semicircular formed openings 199 formed in the tool support means 65B as shown in FIGS. 6 and 7. It will be apparent that each of the openings 199 provides a sufficient semicircular bearing surface to fully retain the associated roller bearing in its proper triangularly spaced position within the tool support means even after the tool 34 is removed therefrom. Thus, only a tangential portion of each of the roller bearings 191B, 192B and 193B extends outwardly from the respective semicircular bearing openings 199 to engage the reduced diameter portion of a toolholder. Although not shown in the drawings, the three triangularly spaced roller bearings 191B, 192B and 193B are preferably supported by antifrictional support means within the associated tool support means 65B to facilitate rotational movement of the toolholder during power driven spindle operation. During insertion or removal of a toolholder from the conical socket 33 in the spindle 30, the inner side face 94B of the arm 94A is power actuated into tight frictional engagement with the adjacent locking flange 84 for effecting simultaneous urging of the external toolholder taper 35 with the conical socket 33 to facilitate threaded power driven engagement and disengagement of the power draw-in bar 112.

Although not shown in detail in FIG. 5, similar semicircular, support means are provided in the respective tool support means 64A, 65A and 66A in order to support the triangularly spaced roller bearings respectively provided in each of these tool support members.

Figure 8:
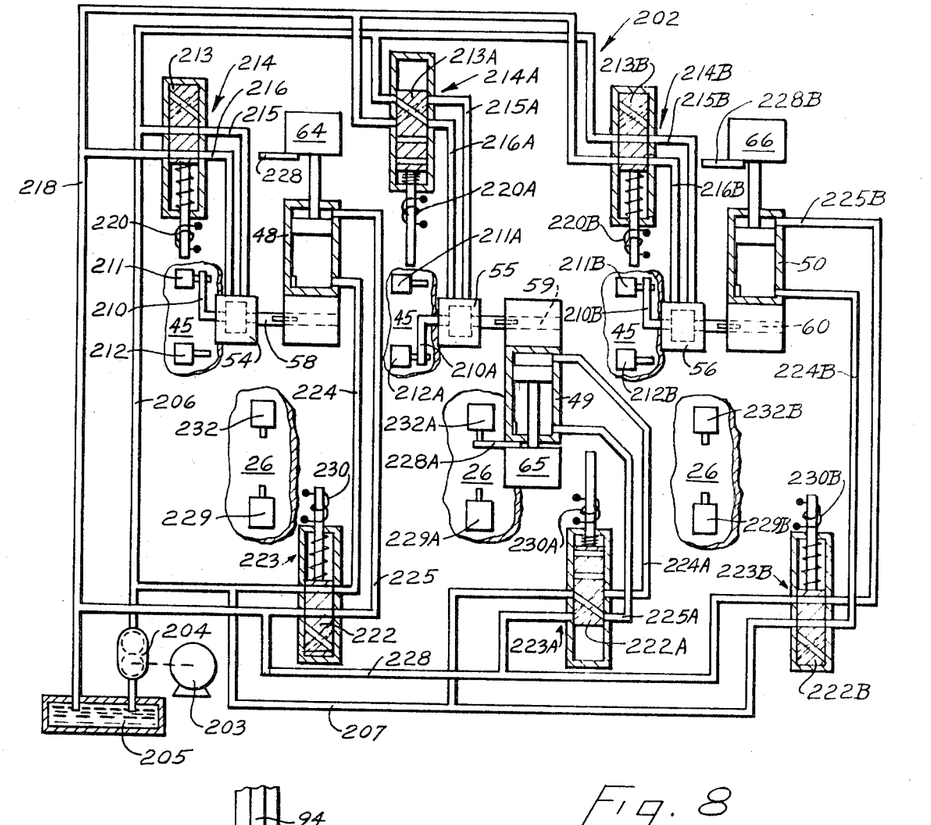
FIG. 8 is a fragmentary view in block diagram form of hydraulically operated power actuators including associated switch controls for pivoting a tool support in a selected direction.

The hydraulic circuit diagram schematically shown in FIG. 8 is appropriate for explaining the operation of the tool change means of FIGS. 1 and 2, as well as the modified tool change means of FIGS. 5, 6 and 7. As shown, a motor 203 is energizeable in known manner to actuate a pump 204 for withdrawing fluid from a sump 205 and transmitting fluid under pressure to main pressure supply lines 206 and 207. Pressure fluid from the hydraulic supply line 206 is connectable to selectively actuate the hydraulic torque motors 54, 55 and 56 for selectively pivoting the associated tool support arms 48, 49 and 50 to a tool storage or a tool inserted position. The pressure supply line 207, on the other hand, is selectively connectable to actuate one or another of the separate tool clamp means 64, 65 or 66 for releasing an associated tool after it has been operatively inserted into the tool spindle. In addition to effecting pivotal movement of the support arm 48, the shaft 58 is rotated by the motor 54 to effect simultaneous rotation of a control dog 210 relative to sequence control switches 211 and 212 as schematically shown in FIG. 8.

With the support arm 48 pivoted upwardly in abutting engagement with the support plate 45, a solenoid valve 214 is deenergized to position the valve spool thereof for transmitting fluid from the pressure supply line 206 to a conduit 215 connected to urge the motor 54 for rotation in a counterclockwise direction. With this condition existing, the exhaust conduit 216 from the motor 54 is connected via the resiliently biased valve spool to a main exhaust line 218. Selective energization of the solenoid 220 of valve 214 urges the associated valve spool 213 downwardly thereby connecting the main pressure supply line 206 to the line 216 for actuating the motor 54 to rotate the support arm 48 in a clockwise direction to insert a tool into the spindle. With this condition existing, the motor line 215 is reconnected via the downwardly displaced valve spool to the exhaust line 218.

Whenever the support arm 48 is maintained in its energized upward position, a valve spool 222 of a solenoid valve 223 is resiliently biased downwardly for transmitting pressure from the main supply line 207 to a line 224 connected to the cylinder of the arm 48 for urging the piston outwardly to retain the clamp means 64 in engaged position. At the same time, the upper end of the arm 48 is connected via an exhaust line 225 in downwardly displaced valve spool 222 to an exhaust line 228 connected to the main exhaust line 218.

Whenever the solenoid 220 is energized to effect downward movement of the valve spool 213 to effect downward pivotal movement of the tool support arm 48 to a tool inserted position, a dog 210 actuates switch 212 coordinately with dog 228 carried by clamp means 64 being moved into position to actuate a switch plunger carried by a sequence control switch 229. Thereupon the control circuit is subsequently actuated, as will hereinafter be explained, to energize a solenoid 230 of the valve 223, thereby effecting upward movement of the valve spool 222. As this occurs, the pressure supply line 207 is connected via the upwardly displaced valve spool 222 to supply pressure fluid to the hydraulic line 225 connected to the upper end of the cylinder in the support arm 48. Pressure fluid admitted to the upper end of the cylinder effects axial upward movement of the tool clamp means of the downwardly pivoted support arm to move the actuating dog 228 upwardly into position to actuate a sequence control switch 232.

As illustrated in FIG. 8, however, it will be apparent that the solenoids 220 and 230 are both illustrated as being deenergized with the respective valve spools 213 and 222 being in resiliently biased tool storage position as shown. The respective parts identified and described in connection with effecting selective pivotal movement of the tool support arm 48 from stored to operating position and vice versa are identified in like manner for the pivotal tool support arm 49 and the pivotal tool support arm 50 shown in FIG. 8. At the outset, it should be stated that the tool support arm 50 is illustrated in both FIGS. 8 and 1 as being in upward pivoted position with the associated tool clamp means 66 engaged. To identify the various parts of the control system, both the electrical and hydraulic parts of the control associated with the tool support arm 50 are identified by the suffix B to differentiate them from the like numbered parts described in connection with the tool support arm 48.

In a similar manner, the electrical and hydraulic portions of the control system associated with the center tool support arm 49 are identified by the suffix A. As shown in FIG. 8, the tool support arm 49 is illustrated as being in downwardly pivoted position to insert a tool into the spindle with the latter being secured thereto by a releasable tool securing means. Downward pivotal movement of the tool support arm 49 is effected by energization of the solenoid 220A operative to effect downward movement of the associated valve spool 213A of the solenoid valve 214A. Thereupon, the pressure supply line 206 is connected via the downwardly displaced valve spool to supply pressure fluid to the line 216A connected to effect downward pivotal movement of the support arm 49 for inserting a tool in the spindle. At the same time, the return line from the motor 55 is connected via the line 215A and the downwardly displaced valve spool 213A to the exhaust line 218. Downward pivotal movement of the arm 49 effects corresponding rotational movement of the motor shaft 59 and the dog 210A from engagement with the switch 211A into actuating engagement with the switch 212A. With the arm 49 pivoted to insert the tool into the spindle as previously described, dog actuation of the switch 212A is connected to actuate the tool securing means for securing the inserted tool into the spindle. Thereupon, the control circuit is then operative to effect energization of the solenoid 230A for actuating the valve spool 222A into upward position for unclamping the tool clamp means 65. A hydraulic circuit is then completed from the pressure supply line 207 via the upwardly displaced valve spool 222A to the line 225A connected to effect disengagement of the tool clamp means 65. Upon upward disengaging movement of the tool clamp means 65, as described, the dog 228A associated therewith is moved into actuating engagement with the sequence control switch 232A, and a return hydraulic circuit is completed via the line 224A and the upwardly displaced valve spool 222A to the exhaust lines 228 and 218.

With the condition illustrated and described for FIG. 8, the tool or toolholder associated with the downwardly pivoted support arm 49 is operatively engaged in the tool spindle. The circuit is thus conditioned for a tool interchange whereby the tool support arm 49 is actuated to pivotably return the tool in the spindle to stored position, and a different one of the tool support arms, either 48 of 50, may be selectively actuated to pivotally insert the respective one of the tools carried thereby into operating engagement with the tool spindle. During operation of the tool control circuit illustrated in FIG. 8, it will be apparent that a minimal number of relative movements are required for effecting an interchange, i.e. pivotal upward movement of the support arm 49 returns the presently inserted tool to upward stored position and pivotal downward movement of a different tool support moves a tool carried thereby into operatively inserted position in the tool spindle. In connection with the respectively described pivotal movements for the two tool support arms, of course, the tool securing means associated with the tool spindle are actuated in coordinate sequential relationship with operation of the tool clamp means respectively associated with the pivotal tool supports.

The modified form of tool storage and change means illustrated in FIGS. 5, 6 and 7 requires only the upward pivotal movement of the modified tool support arm 49A and the sequential downward pivotal movement of a different tool support arm such as 48A in coordinate relationship with the tool securing means associated with the tool spindle. In other words, the modified form of tool storage means shown in FIGS. 5, 6 and 7 requires only the three solenoid valves 214, 214A and 214B together with the associated switching means described in connection with FIG. 8 as being associated with the tool support arms. Because of the antifriction, modified tool supports provided in the tool support means 64A, 65A and 66A; the lower solenoid valves 223, 223A and 223B as well as the associated switching means described in connection with FIG. 8 would not be required.

Figure 9:
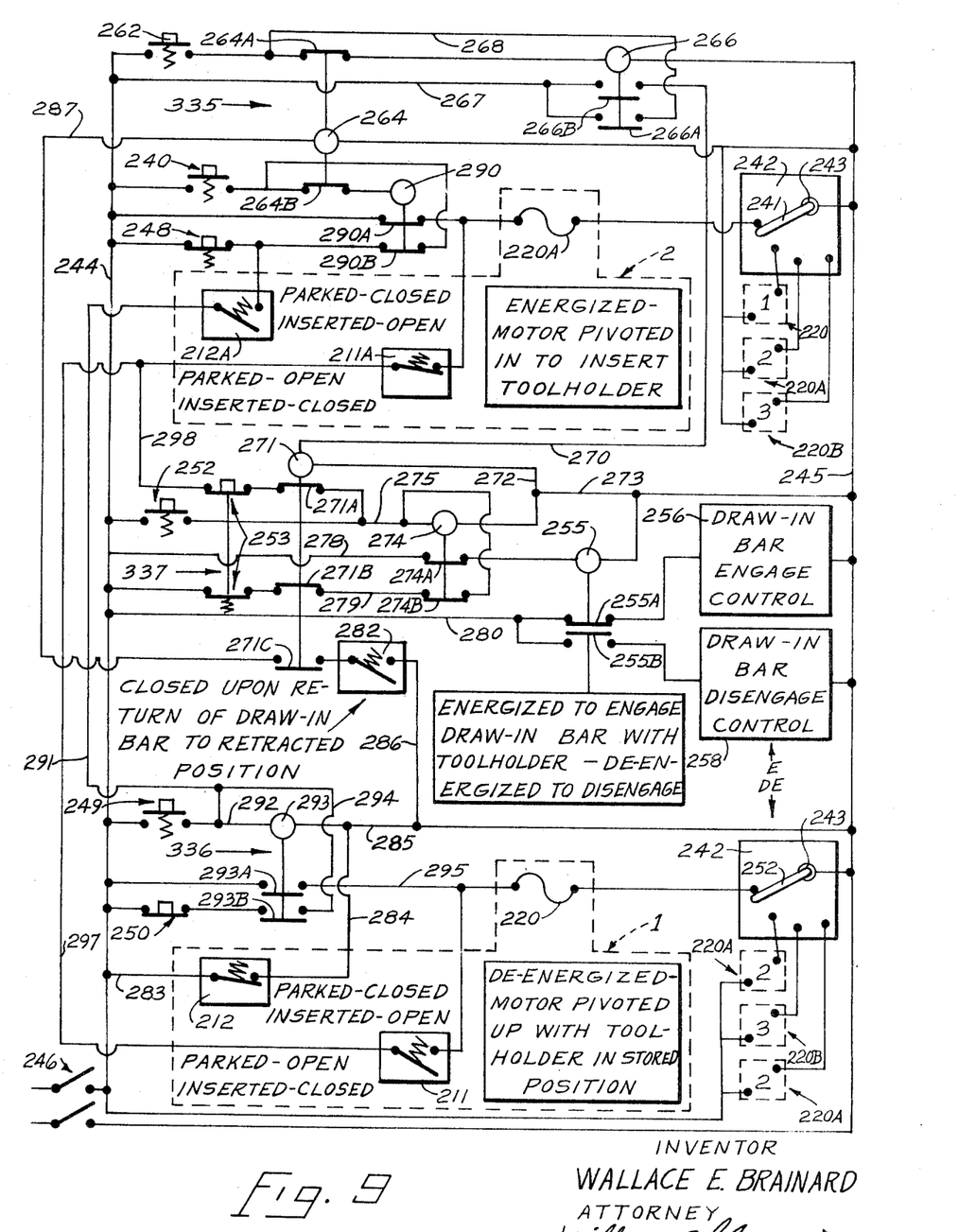
FIG. 9 is a schematic illustration of an electrical control circuit for effecting a selective interchange of tools between the tool operator and the tool storage means.

To simplify an understanding and description of the invention, a simplified control circuit diagram is schematically illustrated in block diagram form in FIG. 9 for controlling pivotal movement of the support arms in coordinated relationship with actuation of the tool securing means associated with the tool spindle. In other words, the control circuit of FIG. 9 relates essentially to the modified form of the invention described in connection with FIGS. 5, 6 and 7. Although not shown or described in FIG. 9, it will be apparent that the electrical control circuit associated with the solenoids, 223, 223A and 223B or the tool clamp means 64, 65 and 66 can be readily appended to the control circuit illustrated in FIG. 9.

A control circuit for controlling the individual pivotal tool support arms as well as the automatically operable draw-in bar is schematically illustrated in the block diagram of a control circuit in FIG. 9. As there shown, the control circuit is divided into a first tool transfer control 335, a second tool transfer control 336, and a draw-in bar control 337. The first circuit control 335 is provided with a pushbutton switch 240 selectively engageable to energize a solenoid 220, 220A or 220B. The solenoids identified are illustrated in FIG. 8 and are individually associated with circuit portions contained within the dashed lines indicated at No. 2, No. 1, No. 2 or No. 3. As shown in FIG. 9, the rotatable control knob of a switch 242 is positioned to engage a switch contact 241 to interconnect the circuit portion "2" between a pair of energized supply conductors 244 and 245 respectively energizable from main supply conductors upon engagement of a disconnect switch 246. In addition to effecting selective energization of one of the interconnected solenoid circuit portions, the circuit portion 335 is provided with a normally closed pushbutton switch 248 actuatable to deenergize that circuit portion for deenergizing the associated solenoid to effect pivotal return movement of the tool to stored position.

A similar arrangement is provided for the circuit change transfer portion 336 which includes a normally open pushbutton switch 249 and a normally closed pushbutton control switch 250. As shown in FIG. 9, the upper and lower portions of the common control switch 242 is provided with a single rotatable control knob 243 connected to simultaneously actuate an upper switch arm 241 and a lower switch arm 252 in order to effect simultaneous interconnection of different portions of the control circuits for sequentially controlling different pivotal toolholders. With the switch arm 252 in its upward position engaging the first contact, the circuit portion No. 1 is interconnected to render the solenoid 220 energizable for the first pivotal arm in response to the control portion identified as 336.

The portion of the control circuit identified as 337 is provided with a normally open pushbutton control switch 252 and a normally closed pushbutton switch 253 respectively operative to actuate the tool draw-in bar for selectively connecting or disconnecting an inserted tool from the tool spindle. As shown in FIG. 9, a relay 255 is illustrated in energized condition to effect corresponding energization of a circuit 256 for actuating the draw-in bar tool engage control circuit. Although not completely shown in this circuit, it will be understood the tool engage control circuit 256 includes the motor energizing switch 179 for effecting energization of the motor 149 in a forward direction to engage the draw-in bar and coordinate energization of the clutch actuating solenoid 151. Once the draw-in bar has threaded itself tightly into the toolholder, a separate control circuit (not shown) is provided to disengage switch 179, solenoid 151 and motor 149.

Deenergization of the relay 255 is operative to effect energization of a draw-in bar tool disengage control circuit 258. The circuit 258 is likewise operative to effect coordinate energization of the solenoid 151, actuation of the switch 179 to effect reverse rotation of the motor 149 for rotating the draw-in bar 112 in a reverse direction to unthread it from a toolholder to permit withdrawal of the toolholder in the spindle.

It is not deemed necessary to show or describe in detail the portion of the control circuit for effecting engagement or disengagement of the draw-in bar since the latter is shown and described in detail in the aforementioned U.S. Pat. No. 3,038,386 entitled, "Power Operated Draw-in Bar". Furthermore, the specific control elements for actuating the switch 179, solenoid 116 and directionally controlled energization of the motor 149 have been shown and described in detail in connection with FIG. 2 of the present invention. Likewise, energization of these illustrated control elements are described in connection with the tool engage control 256 and tool disengage control 258 of the block diagram in FIG. 9. The principal objective of the schematic block diagram is to illustrate in simplified form that portion of the circuit 337 directed to selective engagement and disengagement of the draw-in bar.

It will now be assumed that a tool interchange is to be effected and that one toolholder is secured within the spindle by engagement of the draw-in bar, and the other two toolholders are in pivotally positioned stored location. Likewise, the control circuit is conditioned as illustrated in the block diagram of FIG. 9 with the respective contact bars 241 and 252 of switch 242 engaging the first contacts respectively associated with solenoids 220A and 220. Further, it will be assumed that the portion of the circuit identified at 335 is energized to energize the solenoid 220A for positioning the toolholder associated therewith in the tool spindle.

With these conditions existing, a tool interchange can be effected by depressing the normally open pushbutton switch 262. Closure of the switch 262 completes a circuit via the normally closed contact of the relay 264 to energize a relay 266, the circuit being completed between the energized supply conductor 244 and the energized conductor 245. The usual holding circuit is completed from a conductor 267, the now closed contact bar 266A to a conductor 268. Simultaneous closure of a contact bar 266B completes another circuit from energized conductor 267 to a conductor 270 connected to energize the coil of a relay 271. The energized circuit continues from the coil of relay 271 via a conductor 272 and a conductor 273 connected to the energized supply line 245. Upon energization of the relay 271, a normally closed contact bar 271A thereof is moved to open position interrupting an energized circuit to a conductor 275 to deenergize the originally energized relay 274. Thereupon the associated contact bars 274A are moved to normally open position respectively interrupting originally energized circuits therethrough. Movement of the contact bars 274A to normally open position interrupts circuits from the energized conductors 278 and 279. As this occurs, an energized circuit to the coil of relay 255 is positively interrupted to deenergize the relay and effect movement of the associated contact bar 255A to its normally opened disengaged position for deenergizing the draw-in bar tool engage control 256. At the same time, the associated contact bar 225B is moved into normally closed position, completing a circuit from energized conductor 282 to energize the draw-in bar tool disengage control. Energization of the control 258 again effects energization of switch 179, solenoid 116 and reverse directional rotation of the motor 149 for threadedly disengaging the draw-in bar from the toolholder. Upon complete disengagement of the draw-in bar, a normally open switch 282 is moved to closed position indicating that the tool carried by the spindle can be removed by effecting the necessary pivotal movement of the associated tool support bar.

A tool retracting circuit is then completed from the energized conductor 244, a conductor 283, the normally closed switch 212, to a conductor 284. The energized circuit continues via conductors 285, 286, the now closed switch 282, the closed contact bar 271C of energized relay 271 to a conductor 287 connected to effect energization of a relay 264, this circuit being completed to the energized line 245. Energization of the relay 264 effects movement of the normally closed upper contact bar 264A to open position thereby interrupting the holding circuit to energized relay 266. At the same time, the normally closed lower contact bar 264B is moved to open position to interrupt the holding circuit to originally energized relay 290. As this occurs the upper contact bar 290A is moved to normally open position to effect deenergization of the solenoid 220A causing return movement of the associated toolholder to pivotally stored position. At the same time, the contact bar 290B is returned to normally open position interrupting the originally effected holding circuit to the relay 290. Upon return movement of the pivotal arm to its stored position, switch 211A is moved to open position and associated switch 212A is moved to closed position. Closure of switch 212A, in turn, completes a circuit from energized conductor 244 via the normally closed pushbutton switch 248 and the now closed switch 212A to a conductor 291. The conductor 291 is connected via a conductor 292 to energize the coil of a relay 293, this circuit being completed via the conductor 285 to the line 245.

Closure of the lower contact bar 293B completes a holding circuit to a conductor 294 for retaining the relay 293 energized. Simultaneous closure of the upper contact bar 293A completes the circuit from energized conductor 244 to a conductor 295 connected to energize the solenoid 220 for effecting pivotal movement of the tool support bar 48A to closed tool inserting position. On pivotal movement of the tool support 48A in response to energization of the solenoid 220, the upper switch 212 is actuated to open position, as hereinbefore described, and the lower switch 211 is actuated to closed position. Closure of the lower switch 211 completes a tool securing circuit from the energized conductor 295 to a conductor 297. The energized conductor 297 is connected via a conductor 298, the normally closed upper contact bar of switch 253 and the normally closed contact bar 271A of now deenergized relay 271 to a circuit connected to energize the coil of a relay 274. Energization of the relay 274, in turn, effects closure of the associated contact bars 274A and 274B. Thereupon, closure of the upper contact bar 274A reenergizes the relay coil 255, effecting closure of the contact 255A to reenergize the draw-in bar tool engage control 256. With this condition reestablished, the draw-in bar is again threadedly engaged with the now inserted tool carried by the pivotal tool support 48A.

Once a tool interchange has been effected by depressing the normally open pushbutton switch 262, as described, it will be apparent that the circuit portion 335 in FIG. 9 is deenergized to effect corresponding deenergization of the solenoid 220A and return movement of the associated tool support to stored position. At the same time, the associated second tool control circuit portion 336 is energized to effect energization of the solenoid 220 for actuating the associated pivotal tool support to tool inserting position. Likewise, the circuit portion 337 is reenergized to effect threaded engagement of the draw-in bar for fixedly securing the inserted tool into the tool spindle. With these conditions established, as schematically indicated in FIG. 9, the switch control knob 243 is positionable to advance the respective switch arms 241 and 252 into engagement with the second terminals for reconnecting the switch control circuits 1 and 2 respectively into the control circuits 335 and 336. With such interconnection effected, it will be apparent that depressing the normally open pushbutton switch 262 will effect the return movement of the respective support arms to the positions now indicated in the drawings.

In a similar manner to that described, the switch 242 is repositionable with respective switch arms 241 and 252 engaging the third terminals to interconnect the switch control circuits No. 2 and No. 3 as there shown. Likewise, with the switch arms 241 and 252 rotated into engagement with the fourth terminal, the switch control portions "3" and "2" will be respectively interconnected in the tool circuit portions 335 and 336. It will be apparent that the switch 242 provides a simple means for effecting an interconnection of the schematically indicated circuit portions 335 and 336 in predetermined coded combination for effecting a like interchange of tools.

In effecting a tool interchange it is particularly emphasized that aside from disengagement of the spindle tool securing means and subsequent reengagement of the spindle tool securing means, a tool interchange can be effected by pivoting one tool support arm from tool inserting to tool stored position, and sequentially pivoting a different tool support arm for pivotally inserting the next tool into the tool spindle.

From the foregoing detailed explanation of the operation of the tool changing mechanism and machine tool herein set forth as a practical embodiment of the present invention, it will appear that there has been provided a greatly improved automatic machine in combination with an improved tool changing mechanism.

Although the illustrative embodiments of the invention have been described in considerable detail for the purpose of fully disclosing a practical operable structure by means of which the invention may be practiced, it is to be understood that the particular apparatus and control system described herein are intended to be illustrative only and that the various novel characteristics of the invention may be incorporated in other structural forms without departing from the spirit and scope of the invention as defined in the subjoined claims.

The principles of this invention having now been fully explained in connection with the foregoing description, I hereby claim as my invention:

1. In a machine tool having an upstanding support;
   a tool receiving spindle rotatably journaled in said support;
   selectively engageable tool securing means carried by said tool spindle;
   separate power drives respectively connected to selectively rotate said tool spindle and to selectively actuate said tool securing means to either a tool engaged or disengaged position respectively;
   a plurality of separate stationary pivot axes carried by said support in predetermined angularly spaced transverse positions relative to said spindle axis;

a corresponding plurality of tool support arms pivotally secured at one end to said respective pivot axes for individual radial pivotal movement relative to the tool receiving end of said tool spindle;

individually releasable tool securing retainers respectively secured toward the outer ends of said pivotal tool supports;

power operable means connected to pivot one of said tool support arms arcuately outwardly for withdrawing an inserted tool from said spindle and retracting it therefrom to an outwardly spaced stored position in said support;

said power operable means being connected to selectively pivot a different one of said tool supports radially inward for moving a tool carried by said associated tool securing means into inserted position in said tool receiving spindle; and, control means connected to actuate said spindle securing means to engaged position for securing an inserted tool to said spindle.

2. In a machine tool according to claim 1 including a tapered tool receiving socket and a tool carried by said support arm retaining means being provided with a taper complementary to said tapered spindle socket for releasable engagement therein.

3. In a machine tool having an upstanding support;
a tool receiving spindle journaled to rotate in said support;
a plurality of radial tool arms pivotally secured at one end to said support for selective individual pivotal rotation about correspondingly different stationary pivot axes respectively perpendicular to a plurality of corresponding planes extending radially outward from the rotational axis of said spindle;
tool securing means respectively carried at the outer ends each of said tool arms adapted to support a different tool;
power operable means connected to pivot said tool arms to outward parked positions for moving the tools respectively carried thereby to disengaged stored positions relative to said spindle; and,
a controller connected to selectively actuate said power operable means for pivotally moving a selected one of said tool arms in the opposite direction to bodily insert the tool carried thereby into said tool receiving spindle for operative engagement therewith.

4. In a machine tool according to claim 3 including circuit control means connected to operate said controller for actuating said power operable means for moving said tool inserting arm in a reverse direction to return the tool operatively engaged in said spindle to a return storage position; and,
sequence control means responsive to return movement of said inserted tool to storage position connected to actuate said power operable means for pivotally moving a different one of said tool arms in the opposite direction to bodily insert the tool carried thereby into operative engagement with said spindle.

5. In a machine tool according to claim 3 including releasable tool securing means operatively connected to releasably secure an inserted tool in said spindle in response to operation of said controller.

6. In a machine tool having a tool operator provided with an outwardly tapered tool receiving socket;
a unitary tool receiving storage member pivotally secured at one end for pivotal movement about a stationary axis transverse to the rotational axis of said spindle, said storage member being provided at its opposite end with means for engaging the shank of a toolholder having a tapered tool engaging portion complementary to the tapered socket of said operator; and,
power operable means connected to effect pivotal movement of said storage member for moving said clamp means through a circular path to move the tapered shank of the toolholder carried thereby directly into complementary driven engagement with the complementary tapered socket in said tool operator.

7. In a machine tool according to claim 6 including power driven tool securing means operatively engageable to releasably secure a toolholder inserted in said operator by pivotal movement of said tool storage member.

8. In a machine tool according to claim 6 including releasable power actuated clamp means carried by said storage member; and,
control means for selectively releasing said power actuated clamp means after a tool is inserted thereby in said tool operator.

9. In a machine tool having a support head;
a selectively rotatable tool receiving spindle journaled in said support head and being provided with an outwardly tapered conical socket complementary to and adapted to receive the complementary tapered end of a toolholder;
a tool support arm pivotally secured at its outer end to said support head a sufficient radial distance from said spindle axis to pivot the tapered end of a tool carried at the opposite end of said arm into direct driving engagement with the outwardly tapered conical end of said spindle in one direct pivotal movement, said support arm being provided at its opposite outer end with means adapted to receive and support a toolholder having a complementary inwardly tapered end oriented in a direction opposite to the tapered tool receiving socket in said spindle, said toolholder being so positioned that its axis is maintained in substantially fixed perpendicular relationship to said support arm; and,
selectively reversible power drive means connected to selectively pivot said tool support arm in one direction for directly and pivotally moving the tapered end of a toolholder carried thereby into direct driving engagement with the outwardly tapered conical socket of said tool spindle in one single inward pivotal movement.

10. In a machine tool having a support head;
a selectively rotatable tool receiving spindle journaled in said support head;
a plurality of separate support arms pivotally secured to said support head in a storage position a spaced radial distance from the axis of said spindle for selective and individual pivotal movement relative thereto, each of said support arms being respectively provided at its outer end with individual tool retaining means respectively adapted to support a single tool in fixed perpendicular relationship to said associate support arm;
power operable means selectively energizable to pivot a selected one of said tool support arms in one direction from a parked storage position in said support head for moving an associated tool carried at the opposite end of said arm in one continuous pivotal movement directly into driving engagement with said tool receiving spindle; and,
control means connected to selectively reverse said power operable means for effecting reversed pivotal movement of said selected tool support arm for transferring said tool from driving engaged position in said spindle in a single continuous pivotal movement from said spindle to a return storage position in said support head.

11. In a machine tool having a support member;
a power driven tool spindle journaled to rotate in said member and being provided with an outwardly tapered conical socket complementary to and adapted to receive the complementary inwardly tapered spindle socket being operative to engage the tapered end of a toolholder pivotally engaged therewith and operative to selectively transmit power for rotatably driving said inserted tool;
a plurality of tool support arms each respectively pivoted at one end to rotate about its respective stationary axis substantially perpendicular to the axis of said spindle and being individually radially disposed relative thereto, each of said tool support arms being respectively provided at its opposite end with means adapted to receive and grip a toolholder having a complementary tapered end oriented in a direction opposite to the tapered tool receiving socket in said spindle for direct driving insertion therein; reversibly operable power drive means connected to selectively urge a selected one of said tool support arms to pivot inwardly from an outer parked position to effect direct inward movement of a tapered toolholder carried thereby into direct pivotally urged driving engagement with said tapered socket presented by said spindle; and, control means connected to selectively actuate said power drive means to selectively pivot one of said tool support arms in a reversed direction for directly and pivotally withdrawing the taper end of said toolholder from driving engagement with said conical socket presented by said spindle and directly returning said toolholder to stored position.

12. In a machine tool according to claim 11 including separate axially releasable tool clamping means respectively carried by each of said tool support arms and being respectively adapted to selectively release a toolholder therefrom after said toolholder is operatively and pivotally inserted into driving engagement with said conical socket in said spindle by power driven movement of tool support arm.